Oct. 5, 1971  V. H. WALDIN  3,609,987
METHOD AND APPARATUS FOR EXTRACTING HEAT FROM ARTICLES
WITH AN EBULLIENT LIQUID FREEZANT
Filed April 1, 1970
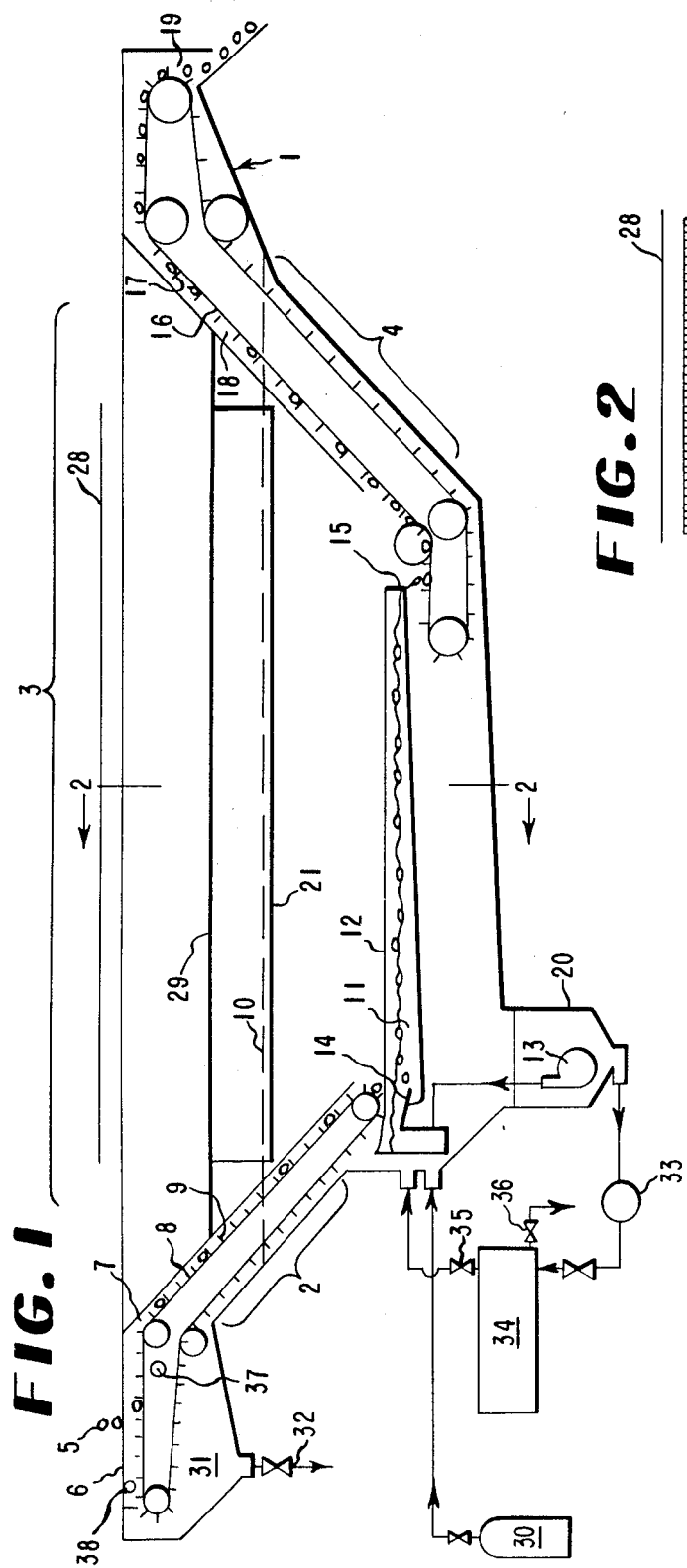
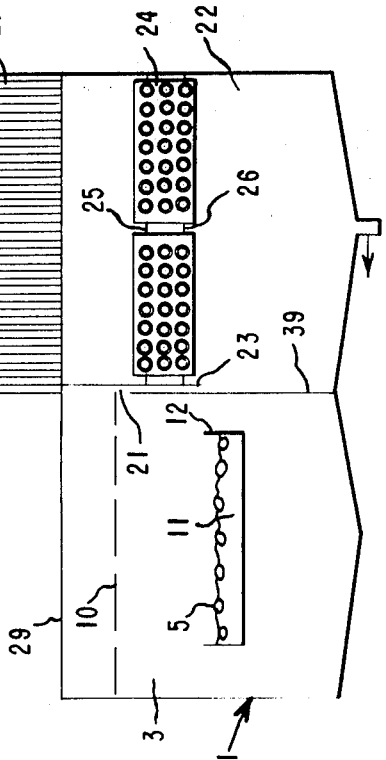
INVENTOR
VINCENT H. WALDIN
BY  *Louis H. Rombach*
ATTORNEY United States Patent Office 3,609,987
Patented Oct. 5, 1971

3,609,987
METHOD AND APPARATUS FOR EXTRACTING HEAT FROM ARTICLES WITH AN EBULLIENT LIQUID FREEZANT
Vincent H. Waldin, Wilmington, Del., assignor to E. I. du Pont de Nemours and Company, Wilmington, Del.
Filed Apr. 1, 1970, Ser. No. 24,532
Int. Cl. F25d 13/06
U.S. Cl. 62—63                                                              10 Claims

ABSTRACT OF THE DISCLOSURE

In an improved method, and apparatus, for extracting heat from articles by directly contacting the articles, in the heat extraction zone of an open vessel, with an ebullient liquid freezant, while producing and maintaining a non-condensable gas-freezant vapor interface in the vessel by means of a vapor condensing means in the vessel, said condensing means being operated at a temperature below the normal boiling point of the freezant, the level of the interface being below the level of all paths to the outside atmosphere but above the level at which the articles come in direct contact with the liquid freezant, said articles being introduced into and removed from the vessel without substantially disturbing the interface and without introducing any significant amount of non-condensable gas below the interface, the improvement comprising, while utilizing a suitable apparatus, producing and maintaining interfaces in the heat extraction zone and in an adjacent, vapor communicating, vapor condensing zone of the vessel by means of a vapor condensing means located in the vapor condensing zone, condensing substantially all the freezant vapor generated in the heat extraction zone and communicated to the vapor condensing zone, and recycling condensed freezant from the vapor condensing zone to the heat extraction zone.

BACKGROUND OF THE INVENTION

(1) Field of the invention

This invention relates to the extraction of heat from articles, as in the freezing of food, by directly contacting the articles with a liquid, fluorinated halohydrocarbon freezant in an open vessel.

(2) Description of the prior art

It is known that food can be satisfactorily frozen by direct contact with an ebullient, liquid, fluorine-containing, halogenated alkene freezant. Robillard in U.S. Pat. 2,059,970 teaches the freezing of food by immersion in such a freezant in a vessel which is open to the atmosphere. The disclosed vessel contains openings through which food is introduced and removed at a level intermediate between a body of liquid freezant and a vapor condenser. The freezing method is predicated upon the assumption that the freezant vapors evolved during immersion of the food in the liquid freezant are lighter than air and thus will rise to the top of the vapor space in the vessel where the vapor condenser is located. However, since the vapors of fluorine-containing, halogenated alkane freezants are heavier than air, substantial amounts of these vapors are lost by gravity flow out of the openings. Robillard suggests the use of a freezant having a boiling point of about 50° F. (10° C.), since there is less likelihood of losing much of this freezant through the openings.

In U.S. Pat. 3,368,363 Alaburda et al. disclose the freezing of food by immersion in an ebullient, liquid, fluorine-containing, halogenated alkane freezant in a closed freezing vessel containing vapor locks through which the food is introduced and removed. In order to prevent loss of freezant vapor when the locks are open, Alaburda et al. suggest the use of a negative pressure within the freezing vessel; this may result in the introduction of some air with the food. The freezant vapor evolved during the freezing process and air and water vapor introduced with the food are continuously withdrawn from the freezing chamber, compressed, and cooled, thereby condensing most of the water and freezant vapor. Condensed freezant is returned to the freezing chamber, while air and uncondensed freezant vapor are vented to the atmosphere. In commercial practice using the Alaburda et al. apparatus, it has been found that freezant vapor losses are undesirably high. Moreover, food is frequently damaged during closing of the vapor locks.

In U.S. Pat. 3,498,069 Waldin discloses a method of, and apparatus for, extracting heat from articles, as in the freezing of individual food particles, by direct contact with an ebullient liquid freezant in an open vessel. The vessel is equipped with a suitable condenser which, during operation of the system, provides a non-condensable gas-100% freezant vapor interface below the level of all paths to the outside atmosphere and above the level at which the articles come in direct contact with the liquid freezant. The articles are introduced into and removed from the vessel without substantially disturbing the non-condensable gas such as air above the interface and without introducing any significant amounts of non-condensable gas below the interface. Generally, the system employs long entrance and exit passageways with appropriate conveying means for introducing and removing the articles, with the openings of the passageways being above the non-condensable gas-freezant vapor interface to preclude loss of freezant. The need for long entrance and exit passageways adds to the cost of the apparatus and may sufficiently increase the headroom requirement to hamper its use in confined areas. Moreover, in some cases, it is difficult to achieve constancy of the interface level in the system.

OBJECTS AND SUMMARY OF THE INVENTION

It is an object of this invention to provide an improvement in prior art process and apparatus for extracting heat from articles. It is a further object to provide such a process which utilizes a non-condensable gas-freezant vapor interface in an open vessel. Still another object is to provide such an apparatus which provides economical commercial feasibility. Other objects will be apparent from a reading of the subsequent description.

The objects of the present invention are fulfilled by means of an improved method of extracting heat from articles by directly contacting the articles in a heat extraction zone of an open vessel with an ebullient, liquid, fluorinated, $C_1$ to $C_4$, saturated halohydrocarbon freezant having a vapor density at its normal boiling point of at least two times that of air at the same temerature, while producing and maintaining a non-condensable gas-freezant vapor interface in the vessel by means of a vapor condensing means in the vessel, said condensing means being operated at a temperature below the normal boiling point of the freezant, the level of the interface being below the level of all paths to the outside atmosphere but above the level at which the articles come in direct contact with the liquid freezant, said articles being introduced into and removed from the vessel without substantially disturbing the interface and without introducing any significant amount of non-condensable gas below the interface, the improvement comprising producing and maintaining a first interface in the heat extraction zone and a second interface, at a lower level than the first, in an adjacent, vapor communicating, vapor condensing zone of the vessel by means of a vapor condensing means located in the vapor condensing zone, condensing substantially all the freezant vapor generated in the heat extraction zone and communicated to the vapor condensing zone, and recycling condensed freezant from the vapor condensing zone to the heat extraction zone.

The aforesaid objects also are fulfilled by means of an improved heat extraction apparatus comprising (A) an open vessel,
(B) a heat extraction zone within the vessel and adapted to hold a liquid freezant,
(C) a vapor condensing means in the vessel for producing and maintaining a non-condensable gas-freezant vapor interface,
(D) means for introducing articles into the heat extraction zone,
(E) means for conveying articles through the heat extraction zone,
(F) means within the heat extraction zone for causing articles to come in direct contact with liquid freezant, and
(G) means for conveying articles out of the vessel, the improved apparatus comprising, in addition to the above, (1) a vapor condensing zone within the vessel, which zone contains said vapor condensing means, the top of which means is below the level of all paths to the outside atmosphere from the zone, which zone is separated from the heat extraction zone by a vertically inclined wall having an opening which provides vapor communication between the zone, the opening being below any opening leading from the vessel to the outside atmosphere, and
(2) means for conducting liquid freezant from the vapor condensing zone to the heat extraction zone.

BRIEF DESCRIPTION OF THE DRAWING

FIG. 1 is a schematic elevation of a simple heat extraction apparatus which employs the concepts of the present invention.

FIG. 2 is a schematic elevation of the heat extraction apparatus of FIG. 1 taken along the line 2—2 of FIG. 1.

DESCRIPTION OF THE INVENTION (1) The articles

In the heat extraction method and apparatus of this invention, heat can be extracted from any liquid or solid article. Although it is expected that this invention will be used primarily for extracting heat from solid food, it is also useful in a wide variety of other applications, including the cooling or freezing of liquids, semi-solids or solids.

The term "articles" is intended to include two or more discrete particles of a single solid commodity, for example, two or more peas, or two or more packages such as boxes or pouches containing food, as well as a continuous flow of a liquid or semi-solid commodity. The size of the articles is not important so long as it is coordinated with the size of the heat extraction vessel, that is, so the articles will pass through the vessel.

Most commonly, this invention will be used for the freezing of solid food. Solid foods which can be satisfactorily frozen by this invention include vegetables, such as potatoes, peas, lima beans, green beans, corn, beets, carrots, asparagus, celery, avocados, eggplant, green peppers, radishes, tomatoes and mushrooms; fruits, such as strawberries, blueberries, raspberries, apples, apricots, peaches, plums, cantalope, grapefruit, pineapple, cherries and grapes; meats, such as beef, pork, veal, lamb and fowl; and seafood, such as scallops, shrimp, fish, and the like.

These foods can be frozen in their natural form, if desired. Large articles of food, such as corn on the cob, whole chickens, sides of beef and the like, are readily frozen in accordance with this invention. On the other hand, it is desirable in many cases to freeze foods in smaller particle sizes. Large fruits and vegetables can be sliced, diced, or cut into balls. The larger fruits, such as apples, apricots, peaches, plums and the like, can be peeled, pitted, and prepared in final portions ready for consumption, for example, in halves, quarters or smaller pieces. Berries are preferably graded, stemmed, washed, and placed in suitable condition for consumption and then immediately frozen. Chunks of meat or seafood can be cut into pieces of suitable size and shape, such as cubes, sticks, patties and the like, and then coated with appropriate materials such as bread crumbs, flour, corn meal and the like, if desired, before freezing.

The present invention also is useful in the freezing of aqueous liquids and semi-solids. Suitable liquids include fruit and vegetable juices such as orange juice, soup, broth, whole blood, aqueous pharmaceutical preparations and the like. Suitable semi-solids include mashed fruits and vegetables such as applesauce and mashed potatoes, pastry dough, soup and the like. Moreover, the invention is useful for cooling non-aqueous liquids such as pharmaceutical tinctures and non-aqueous solids such as metal parts which are to be assembled with other parts having close tolerances.

In accordance with this invention, the articles enter the vessel at a temperature above the normal boiling point of the freezant. Under normal circumstances, the articles will enter the vessel at or above the temperature of the ambient atmosphere which is usually well above the normal boiling point of the freezant.

(2) The freezants

The heat extracting agents used in this invention extract heat from articles by direct contact with the article, thereby changing the physical state of the heat extracting agent from liquid to vapor. The terms "heat extraction" and "heat extracting" are meant to include both the chilling of articles which may or may not contain water, and the freezing of articles which contain water, including most foods. For convenience, the heat extracting agents are referred to as "freezants."

The freezants which are suitable for use in this invention are ebullient, liquid, fluorinated, $C_1$ to $C_4$ saturated halohydrocarbons. The term "flourinated halohydrocarbons" is intended to include halogen-substituted hydrocarbons containing at least one fluorine atom. Thus, the term includes hydrocarbons in which two or more of the hydrogens are substituted by halogen, one of which halogen is fluorine. The hydrocarbon may be an alkane or a cycloalkane.

The freezants used in this invention must have normal boiling points, that is, boiling points at atmospheric pressure, between about 25° C. and —50° C. With freezants boiling above about 25° C., the chilling of articles may be extremely slow. When using freezants boiling below about —50° C. the freezing of articles such as food may result in undesirable cracking. Moreover, recovery of a freezant having a boiling point below about —50° C. imposes the need for a refrigeration system more elaborate than those ordinarily used in conventional food freezing plants, thus adding to the freezing cost of such a system without any corresponding advantage. Preferably, the freezant has a normal boiling point between about —20° C. and —40° C. Because the freezants used herein have normal boiling points below the temperature of the articles being introduced, they are ebullient during use.

The freezants used in this invention must have vapor densities at their normal boiling points at least about twice that of air at the same temperature. This invention uses to advantage the greater density of the freezant vapor as compared with air. Preferably, the freezant has a vapor density at its normal boiling point at least about three times that of air at the same temperature.

Fluorinated, $C_1$ to $C_4$ saturated halohydrocarbons having the combination of boiling point and vapor density falling within the above-defined limits are listed in Table 1.

TABLE 1

| Freezants | Boiling point, °C. | Vapor density at boiling point/air density at same temperature | Liquid density at boiling point, g./cc. |
|---|---|---|---|
| Fluorotrichloromethane | +23.8 | 4.93 | 1.48 |
| Fluorodichloromethane | +8.9 | 3.65 | 1.40 |
| 1,2-dichlorotetrafluoroethane | +3.8 | 6.14 | 1.52 |
| Octafluorocyclobutane | −5.8 | 7.28 | 1.61 |
| 1,1-difluoroethane | −24.7 | 2.35 | 1.01 |
| Dichlorodifluoromethane | −29.8 | 4.36 | 1.49 |
| Chloropentafluoroethane | −38.7 | 5.55 | 1.55 |
| Chlorodifluoromethane | −40.8 | 3.10 | 1.41 |

The liquid densities of the freezants at their boiling points are given in the table. As can be seen from the densities, the freezants, with the possible exception of 1,1-difluoroethane, are all denser than food, which generally has a density of about 1.1±0.1 g./cc. Accordingly, food will generally float on the surface of the freezant, which property can be used to advantage during the heat extraction process.

Mixtures of these compounds with themselves and with other compounds also provide suitable freezants so long as the mixture has a boiling point and a vapor density within the above-defined limits. Qualified mixtures provide a means of obtaining temperatures not obtainable with single component freezants. Azeotropic mixtures, that is, mixtures which yield vapors of the same composition as the liquid, are particularly suitable. The properties of useful azeotropic mixtures are given in Table 2.

TABLE 2

| Azeotropic freezant mixtures Components | Wt. per-cent | Boiling point, °C. | Vapor density at boiling point/air density at same temperature | Liquid density at boiling point, g./cc. |
|---|---|---|---|---|
| Dichlorodifluoromethane Chlorodifluoromethane | 25 75 | −41 | 3.28 | 1.44 |
| Chlorodifluoromethane Chloropentafluoroethane | 49 51 | −46 | 3.89 | 1.50 |
| Dichlorodifluoromethane 1,1-difluoroethane | 74 26 | −33 | 3.59 | 1.33 |

Although freezant mixtures which are not azeotropic also can be used, they are more difficult to handle since the vapors lost to the atmosphere during operation of the system will have a higher concentration of the more volatile component than the liquid freezant mixture. In order to maintain the desired boiling point of the original liquid freezant in the heat extraction vessel when using such a freezant mixture, it is necessary that the make-up freezant mixture have a higher concentration of the more volatile component than the original liquid freezant.

(3) The heat extraction system

In this invention heat can be extracted from articles by direct contact with an ebullient liquid freezant in a heat extraction zone in an open vessel without significant loss of freezant vapor to the atmosphere. By "open vessel" is meant a vessel which is open to the atmosphere, that is, contains at least one opening which allows free vapor communication between the heat extraction zone and the outside atmosphere, thus maintaining said zone essentially in pressure equalibrium with the atmosphere. Freezant losses generally do not exceed about 5 lbs. of freezant per 100 lbs. of articles passed through the system. Under the preferred conditions, freezant losses do not exceed about 2 lbs. per 100 lbs. of articles.

In the operation of the method of the present invention, non-condensable gas-freezant vapor interfaces are produced and maintained in a heat extraction zone and in a vapor condensing zone of the open vessel by means of a vapor condensing means, synonymously referred to herein as a condenser, located in the vapor condensing zone and operated at a temperature below the normal boiling point of the liquid freezant. The two zones are separated by a vertically inclined wall common to both and are in vapor communication with each other through an opening, usually a horizontally elongated passage, in the wall, the opening or passage being below any opening leading from the vessel to the outside atmosphere. The level of the interface in the vapor condensing zone is produced and maintained below the level of the interface in the heat extraction zone and below the level of the overflow passage.

By "vertically inclined wall common to both" is meant a wall which is aligned in a general vertical direction. The wall can be considered as a separating means and is preferably insulated to provide a thermal barrier between the zones. The insulation can be provided by any known insulating means, for example, polyurethane, cork, "Fiberglass," vacuum, air, and the like. It is obvious that the wall can be a single wall, such as represented in FIGS. 1 and 2, or a double wall. If the latter, the wall can be open to the air, for example, along the bottom, thus providing air-insulated zones. The extent of separation, that is, the distance between the zones usually will be dictated by economic considerations. Having the heat extraction zone and the vapor condensing zone thermally isolated from each other provides an operational advantage in that one of the zones can be opened to the air, for example, during cleaning, while the other zone is kept cold. Further to the above, it is to be understood that these zones can be physically separable, that is, they can be constructed separately and then joined together by appropriate vapor-tight connecting means to form the heat extraction vessel. Any suitable vapor-tight connecting means, such as flanges, inflatable gaskets, and the like, can be used.

The opening or vapor connecting passage between the heat extraction zone and the vapor condensing zone can be any suitable passage which allows the freezant vapor to overflow from the former to the latter. Preferably, it is a passage having a controllable size, for example, employing a gate or closing means, to facilitate any necessary isolation of the zones, such as during a cleaning operation.

When the articles from which heat is to be extracted are contacted with liquid freezant in the heat extraction zone, freezant vapor is evolved. The rising vapor spills over into the vapor condensing zone through the opening in the wall common to the two zones. Intermixing of air and freezant vapor is to be avoided; hence, the vapor overflow passage should be at an elevation higher than the region where article contact liquid freezant. Elevating the overflow passage also precludes liquid freezant from spilling over into the condensing zone. The overflow passage must be below the level of all paths to the outside atmosphere to avoid loss of freezant. By "level of all paths to the outside atmosphere" is meant the highest level to which freezant vapor must rise in order to pass from the interior of the vessel to the outside atmosphere. Most commonly the path is an outside opening in the vessel, either in the vapor condensing zone or in the heat extraction zone, or both.

The heavy freezant vapor spilling over from the heat extraction zone to the vapor condensing zone flows downward along the common wall and fills the vapor condensing zone from the bottom, driving any air upward. The condenser is operated at a temperature below the normal boiling point of the liquid freezant and condenses the freezant vapor which rises into the condenser, establishing an interface level in this zone at an elevation dependent upon the load. An interface also is produced in the heat extraction zone; this interface tends to rise and fall with changing loads but is maintained within close limits because of the negligible resistance to vapor flow offered by the vapor overflow passage.

Liquid freezant condensed in the condensing zone and liquid freezant from the heat extraction zone are collected and recycled. A sump or reservoir for liquid freezant can be located in or connected to either or both zones and one or more pumps located in or connected to the sumps can be used to combine the liquid freezant from both zones for recycling. If a single sump is provided in or connected to either zone and liquid from the other zone flows by gravity to the first zone and then to the sump, the liquid flow passage between the zones must be equipped with a trap to assure that vapor communication between the zones occurs only through the vapor overflow passage previously discussed.

When it is necessary to remove the liquid freezant from the heat extraction vessel, for example, for servicing the equipment or at the end of a freezing operation, it is desirable to condense as much of the freezant vapor as possible. If the trap in the liquid flow passage between the zones is opened or if a separate, closable, controllably sized, vapor recovery passage is provided at a level near the bottom of the common wall, continued operation of the vapor condenser with no input of articles effects rapid lowering of the interface level. As a result, freezant losses when the heat extraction zone is opened are minimized.

When the sump is in the condensing zone, cleaning of the heat extraction zone is facilitated because all liquid freezant can readily be wtihdrawn from the heat extraction zone. For short out of service periods the liquid freezant can be held in the sump by operating the condenser at normal temperature. Losses during such periods can be minimized by closing the openings to the outside atmosphere above the condenser. If these openings are provided by clearance beneath the outside edges of a top cover, described hereafter, the cover can be lowered or any of a wide variety or removable seals can be provided. Because the heat extraction vessel is not ordinarily adapted to withstand high pressures, suitable pressure relieving devices must be provided to prevent damage to the vessel in the event of condenser failure while the openings are closed. During short out of service periods, the vapor overflow passage between the heat extraction zone and the condensing zone should be closed as should the vapor recovery passage. For longer out of service periods or complete shutdowns, the liquid freezant can be pumped into a storage vessel designed to withstand the pressure developed when the freezant reaches ambient temperature.

Any air which may be entrained in the freezant vapor flowing through the vapor overflow passage enters freely into the vapor condensing zone without significantly blanketing the heat exchange surface of the condenser. The delivery of freezant vapor to the condensing zone proceeds at approximately the rate of vapor evolution in heat extraction zone and no power driven vapor delivery or flow regulation devices are required. In the preferred operation, a flow regulating device or means consisting of a baffle or shield or barrier is installed in the vapor condensing zone near the overflow passage to direct the entering freezant vapor downward and past the condenser, usually at least as far as the highest elevation of the interface level in the condensing zone at maximum rated load. The baffle extends horizontally for at least the length of the overflow passage, in a generally parallel relationship with the wall separating the heat extraction and vapor condensing zones. Although the baffle can be fixed, preferably, it is a free hanging baffle which responds to the influx of vapor, or in other words, it is a self regulating device which maintains a full channel of vapor, thereby promoting constancy of operation. Operable, but less desirable, is a fixed baffle with an adjustable or self regulating, vapor passing device between the baffle and the common wall.

An especially suitable free hanging, self regulating device is a flexible curtain made of any material substantially imprevious to the freezant vapor and capable of remaining flexible at the freezant boiling temperature. Such a curtain responds quickly to changes in the rate of flow of freezant vapor and delivers widely varying quantities of freezant vapor from the heat extraction zone to the vapor condensing zone with the previously mentioned minimum change in the elevation of the interface in the heat extraction zone and with minimum entrainment of air.

"Non-condensable gas," as the term is used in defining the interface, is a gas which is not condensable under the conditions present at the surface of the vapor condenser. Such non-condensable gas should have a density not more than one-half that of the freezant vapor at the same temperature. Under normal operation, the non-condensable gas is air which, by definition of the freezant, has the required density. In the non-condensable gas-freezant vapor interface the non-condensable gas layer is an upper layer containing any detectable amount of non-condensable gas. An interface is the highest level at which 100% freezant vapor, or the lowest level at which non-condensable gas, is detected. Since the non-condensable gas is normally air, it will be referred to as air in the further discussion of this invention.

After equilibrium has been established during operation, the air above an interface contains freezant vapor in a concentration gradient which decreases from 100% at the interface to zero percent at the level of a path to the outside atmosphere. This gradient is caused by molecular diffusion of the heavier freezant vapor from the interface into the lighter air above and by circulation of the air above the interface due to thermal convection. Under operating conditions, turbulence in the area of an interface, particularly in the air above an interface, causes additional mixing of freezant vapor with the air above the interface, thus further increasing the amount of freezant vapor in this air.

Because the movement of freezant in the upward direction, as reflected by small freezant vapor losses through outside openings in the upper region of the vessel, is generally faster than the rate at which air diffuses and mixes downward into the freezant vapor below an interface, air makes no net gain in movement downward with respect to the interface. As a result, it has been found that an air-freezant vapor interface can be maintained in the heat extraction zone and in the condensing zone.

The level of an air-freezant vapor interface should be maintained below the level of all paths to the outside atmosphere from either zone of the vessel. Maintenance of the interface below this level avoids the loss of gross amounts of freezant vapor to the atmosphere, as would be the case if the interface were at or above the level of a path to the outside atmosphere.

The level of the air-freezant vapor interface in the heat extraction zone should be maintained above the level at which the articles come in direct contact with the liquid freezant. If the interface is maintained below the level of the direct contact, the freezant vapors evolved during heat extraction may cause turbulence in the air above the interface and mix with the air. Maintenance of the interface above the level of the direct contact avoids this source of mixing of freezant vapor with air. The distance of the interface above the level of the direct contact is relatively unimportant provided it is sufficient that the evolved freezant vapors do not substantially disturb the interface.

In order to maintain the interface in the condensing zone below the level of all paths to the outside atmosphere, the top of the condenser is located below the level of all such paths. The optimum configuration of the vapor condenser will vary depending upon the amount of fluctuation in the feed load. Under steady load conditions, that is, conditions which do not cause the interface to rise or fall, the most advantageous configuration is a tall, thin condenser which allows a reduction in the area of the interface, thereby reducing diffusion. However, under non-steady load conditions, that is, conditions which cause the interface to rise and fall, the most advantageous configuration is a condenser which is as short in the vertical direction and as long and wide in the horizontal plane as practical. This arrangement reduces the vertical distance through which the interface rises and falls during operation of the system. Reducing this vertical distance reduces the speed at which the interface moves as it responds to variations in the operating conditions of the system, with a resulting decrease in the amount of mixing above the interface. Thus, the configuration of the vapor condenser is generally a compromise between steady and non-steady load considerations. The vapor condenser can be a single unit of suitable size or a combination of two or more units.

In operating the open heat extraction system of this invention, the vapor overflow passage is capable of accommodating wide variations in the rate of vapor evolution in the heat extraction zone and substantially all the interface fluctuation in this zone is transferred to the vapor condensing zone.

Mixing of freezant vapor and air can be reduced by minimizing the turbulence caused by introducing and removing articles from the vessel. Articles should be introduced into the heat extraction zone without substantially disturbing the air above the interface and without introducing substantially any air below the interface. Articles should also be removed from the vessel without substantially disturbing the air above the interface.

One suitable method of introducing the articles is through an entrance opening which is in free vapor communication with the heat extraction zone. After the articles have been introduced, they are passed downward from the entrance opening through the interface and into the heat extraction zone. Free communication between the outside atmosphere and the heat extraction zone is important because it allows the freezant vapor to displace the air surrounding the articles as they pass through the interface without substantially disturbing the interface or introducing essentially any air below the interface.

Turbulence is minimized during introduction of the articles through the entrance opening by passing them slowly from the entrance opening to the interface. Suitable speeds will vary depending upon the size and shape of the articles being introduced. Generally, it is preferred that the articles move from the entrance opening to the interface at a speed not in excess of 100 feet (30.48 meters) per minute. Preferably, the articles are passed from the entrance opening to the interface at a speed of less than 50 feet (15.24 meters) per minute. Preferably, there is also no tumbling motion which would create turbulence.

The articles are preferably passed through an entrance passageway from the entrance opening to the interface. The purpose of the entrance passageway is to somewhat limit the open area in the entrance zone, thereby reducing convection currents and the volume of air pushed out of the entrance opening under non-steady load conditions. The passageway also tends to reduce the effect of ambient air currents. This passageway, however, should not restrict free vapor communication between the heat extraction zone and the entrance opening.

A number of conveying means can be used to convey the articles from the entrance opening to the heat extraction zone. Suitable conveyors for handling solid articles include belt conveyors, such as wire mesh and other foraminous belts and impervious belts, auger type conveyors, short stroke vibratory conveyors, and the like. The conveyors should be chosen so as to minimize turbulence in the air above the air-freezant vapor interface and to allow free communication between the outside atmosphere and the heat extraction zone. Liquid articles can be introduced through the entrance opening, for example, by running down a trough or duct from which they drip into a freezant bath. After the liquid is frozen, it can be handled as a solid. Liquids which are to be chilled rather than frozen are most readily handled by first sealing them in a container.

Another method of introducing the articles into the heat extraction zone which is suitable for liquids and semi-solids is to pump them in below the interface through a pipe which is not open to the atmosphere. When introducing articles in this way, it is important that the pipe be filled with a continuous stream of the articles whereby essentially no air or other non-condensable gas is introduced below the interface. Introduction of air below the interface causes mixing of air and freezant vapor. Any conventional pump used for food handling can be used for the more fluid articles and suitable extrusion devices can be used for semi-solids such as pastry dough.

After the articles have passed through the heat extraction zone they can be removed from the vessel by passing them upward through the interface and out of the vessel through an exit opening which is in free vapor communication with the heat extraction zone. Turbulence is minimized during the removal of the articles by passing them upward slowly from the interface to the exit opening. Preferably, the articles are passed upward at the same rates specified for passing them from the entrance opening to the interface. As the articles pass upward, the freezant vapor is replaced with air. The conveyors used to remove the articles from the vessel can be any of those mentioned as being suitable for passing solid articles from the entrance opening to the heat extraction zone. Further analogous to the previously described methods of introducing articles into the vessel, articles can be removed from the heat extraction zone and/or the vessel by any means which neither substantially disturbs the air above the interface nor introduces essentially any air below the interface. For example, it has been disclosed that liquids and semi-solids which are to be frozen can be introduced below the interface through a pipe which is not open to the atmosphere. Similarly, articles can be removed from the heat extraction zone and/or the vessel through a pipe. In this case, the liquid or semi-solid which provides the seal between the inside of the vessel and the outside atmosphere need not be the articles being treated. Any suitable liquid or semi-solid can be employed to provide the seal, with the treated articles being removed from the heat extraction zone and/or the vessel in or through the liquid or semi-solid.

Freezant vapor losses can also be reduced by decreasing the effect of ambient air currents on the air above an interface. This decrease can be accomplished by providing a top cover containing the minimum area of outside opening necessary for proper functioning of the system. Under steady load conditions, the smaller the area of the outside opening, the smaller will be losses by diffusion through the opening. On the other hand, when operating under non-steady load conditions, it is preferable that the area of the opening be large enough that atmospheric air, passing through the opening as the interface falls, does not enter at a velocity which causes a substantial amount of turbulence in the air above the interface. The top cover also serves to prevent the entry of air-borne dirt. The area of the outside opening can be regulated by raising or lowering the cover.

In order to provide for equalization of pressure under non-steady load conditions while at the same time avoiding turbulence caused by thermal convection and ambient air currents, it is preferred that there be above an interface a quiescent zone containing a quiescent body of air which moves substantially only in response to the vertical movement of the interface, and which has above it a path to the outside atmosphere such as an outside opening which is in free vapor communication with the interface.

When a quiescent zone is of sufficient volume, it has the effect of allowing the system to tolerate substantial variations in the rate at which articles are introduced without markedly increasing freezant vapor losses. A large quiescent zone provides a reesrvoir of air in its lower region which rises and falls with the interface, but never passes through an outside opening. Because of the substantial absence of mixing in the quiescent zone, the air in the upper region of the zone which passes through the outside opening above the zone when the interface rises contains a relatively low concentration of freezant vapor.

A variety of quiescing means are available which will suppress thermal convection and ambient air currents in a quiescent zone while allowing a body of air to move in response to the vertical movement of an interface and which allow free vapor communication between the interior of the vessel or housing and the outside atmosphere. Suitable means include appropriate baffles, loosely packed material such as glass wool fibers, and honeycomb structures. It is preferable that the quiescing means limit the general direction of flow in the quiescent zone to the vertical direction without causing any substantial change in velocity or direction as the air moves through the quiescent zone, since these changes tend to cause turbulence. Accordingly, the preferred means for creating quiescence is a vertically standing honeycomb structure which resembles a series of closely packed, relatively small diameter, parallel tubes standing in the vertical direction.

The level of the air-freezant vapor interface is generally not the same throughout the vessel. As already indicated, the interface level in the vapor condensing zone is lower than that in the heat extraction zone. Moreover, when entrance and exit passageways are present, the level of the interface in the heat extraction zone tends to be below the level of the interface in the entrance and exit zones. These differences in levels result from differences in temperature and resistance to vapor flow in the various zones.

The temperature at any level in the vessel is not necessarily the same in all zones. Since the freezant liquid contact takes place in the heat extraction zone, the temperature in this zone tends to be somewhat lower than the temperature in the entrance and exit zones. The extent to which this difference in temperature exists will be affected by the degree of isolation between the zones, that is, whether entrance and exit passageways are present. The temperature in the entrance zone is further increased by the comparatively warm articles being introduced through it.

Due to the effect of temperature on the density of gases, the warmer gases in the entrance and exit zones will be substantially less dense than the gases in the heat extraction zone. The density of gases at 10–20° C., for example, is only about 80% of the density of the same gases at a typical vapor condenser temperature of −43° C. Since the more dense gases in the heat extraction zone have a higher static pressure head than the less dense gases in the entrance and exit zones, the interface level in the heat extraction zone tends to be lower than in the warmer zones. In the present invention, the relatively unimpeded flow of freezant vapor from the heat extraction zone to the vapor condensing zone makes it possible to maintain the vapor levels in the entrance and exit zones at a low enough level that elevated passageways for the entrance and exit conveyors are not required.

The operation of this invention does not depend upon any particular method of directly contacting the articles with the liquid freezant. The articles can be contacted, for example, by immersion in a bath of liquid freezant, by being sprayed with liquid freezant, and the like. The heat extraction can be carried out either by continuously contacting the article with the liquid freezant until the desired amount of heat has been removed, or by an interrupted freezing technique in which the article is first contacted with the liquid freezant until only a portion of the desired amount of heat is removed, and then removed from contact with the freezant thereby allowing the icy shell to cold-flow and relieve internal stresses before contact with the liquid freezant is resumed.

In the present invention, the food can be passed through the heat extraction zone using conventional conveying means. Suitable means of moving articles through the heat extraction zone include a stream of liquid freezant, a gas jet moving across the surface of a body of liquid freezant, a mechanical auger, a foraminous belt, and the like. When the first contact between solid food and liquid freezant is to be on a belt conveyor, the conveyor should have a minimum area of contact with the food so that sticking of the food to the conveyor by freezing is minimized. A suitable conveyor for this purpose is a wire mesh conveyor having needle point contact with the food. Wire mesh conveyors having a non-stick coating such as polytetrafluoroethylene are also suitable.

DETAILED DESCRIPTION OF THE DRAWING

The following description of FIGS. 1 and 2 illustrates a specific embodiment of this invention, namely, the freezing of solid food particles. The food freezing apparatus comprises insulated open freezing vessel 1 which contains entrance zone 2, heat extraction zone 3 and exit zone 4. Food particles 5 are introduced through an entrance opening at or near 6 and carried downward into entrance passageway 7 by entrance conveyor 8 which is of wire mesh construction and has cleats 9 of a height and spacing suitable for the food being handled.

Food particles pass downward through air-freezant vapor interface 10 and free-fall into a body of liquid freezant 11 in quick freezing pan 12. As the food is conveyed downward, air in the interstices of the food particles is replaced by heavy freezant vapor. The food particles free-falling from conveyor 8 generally dip down under the surface of the liquid freezant. This results in rapid formation of a frozen crust or shell on the food particles. The particles then rise and float on the surface of the liquid freezant which has a density greater than that of the food. The vigorous boiling action of the freezant, as it is vaporized by the heat extracted, separates the food particles which might otherwise freeze together as they dip down into the freezant. Once the frozen crust is formed on the surface of the food particles, they no longer tend to adhere to one another. The rapid formation of the frozen crust also assures that natural fluids and additives are not lost from the food particles.

The depth of the liquid in pan 12 must be sufficient that food particles free-falling from the conveyor do not contact the bottom of the pan. Liquid freezant is supplied to pan 12 by adjustable circulating pump 13. A steady flow at the surface of the freezant in the pan is caused by baffle 14, thereby insuring rapid movement of food out of the free-fall area toward spill point 15 without recirculation in any part of the pan. By adjusting the length of time the food remains in the pan, the desired degree of freezing can be achieved.

The flow of liquid freezant from pan 12 sweeps the food onto exit conveyor 16 which is also of wire mesh construction and is wider and has higher cleats 17 than entrance conveyor 8, but is otherwise similar. Because the frozen food can now be stacked without sticking together, exit conveyor 16 travels more slowly than entrance conveyor 8. As the frozen food is conveyed upward through air-freezant vapor interface 10 through exit passageway 18 toward exit opening 19, the heavy freezant vapor in the interstices of the food particles is replaced by air and flows downward toward the heat extraction zone. Liquid freezant which drains through the exit conveyor collects in sump 20.

Freezant vapor evolved in freezing pan 12 or elsewhere flows from the heat extraction zone 3 through vapor overflow passage 21 into the vapor condensing zone 22 which is within the vessel and has a common wall with the heat extraction zone. Although a single condenser is generally used in the vapor condensing zone, a multi-sectional condenser can be used if desired. The flow of freezant vapor through the overflow passage pushes aside free hanging flexible curtain 23 which extends from above the top of vapor overflow passage 21 and interface level 10 to at least as far as the highest elevation of the interface level in the vapor condensing zone at maximum rated load. The heavy freezant vapor fills the condensing zone from the bottom, driving air above it, and is condensed by parallel finned tube bundle vapor condenser 24. The condenser is the evaporator of a standard refrigeration system using ammonia or a fluorocarbon refrigerant and produces a suitable surface temperature for condensing the freezant vapors. Freezant liquid condensed by vapor condenser 24 is returned to sump 20 by conduit means not shown.

As the rate at which freezant vapor is evolved varies with the rate at which food is introduced, the level of interface 10 tends to rise and fall. Because flexible curtain 23 offers little resistance to the flow of freezant vapor, fluctuations in the interface level in the freezing vessel are minimized. Elevated inlet and exit passages are not required to reduce the loss of freezant vapor to an acceptable level.

The interface level in vapor condensing zone 22 also tends to rise and fall with changes in the rate at which food is introduced into the heat extraction zone. During operation with a maximum rated amount of food being passed into and through the heat extraction zone, the interface is about ⅔ of the way up the height of condenser 24 as illustrated at level 25. The portion of the condenser above level 25 provides excess condensing surface for surges, upsets, and maldistribution of vapor. Under idling conditions in which no food is being passed through the vessel, the interface is just above the bottom of the condenser as illustrated at level 26.

Loss of freezant vapor from the vapor space in the condensing zone is minimized by retarding thermal convection and ambient air currents in this area. Phenolic resin-impregnated paper honeycomb structure 27 is installed above the entire condenser area to create a quiescent zone. Dust cover 28 located above the top of honeycomb structure 27 is provided to reduce entry of air-borne dirt but should not restrict breathing in the honeycomb passages.

No honeycomb structure is provided above the heat extraction zone. Cover 29 is provided at a level higher than the maximum interface level and also higher than the top of vapor overflow passage 21.

The elevation of the condenser can be varied widely so long as the highest elevation of the interface level in the condensing zone at maximum rated load is below the lowest level of the vapor overflow passage. The elevation of the bottom of the condensing zone can be below that of the heat extraction zone, in which case a pump may be required to recycle the condensed freezant.

The freezing of high moisture content foods, especially when they have been cut or sliced, or the immediate freezing of foods which have been blanched, or otherwise treated with aqueous brines, as is commonly practiced, may result in a high moisture intake into the freezing vessel. The vapor of the preferred freezant, dichlorodifluoromethane, forms a crystalline or semi-solid hydrate in the presence of water vapor at temperatures btween about 0° C. and 7° C. If this hydrate forms on the food during the freezing process, it may impart an unattractive frothy appearance to the food as it is being thawed, the froth resulting from the decomposition of the hydrate to dichlorodifluoromethane vapor and water.

Fouling of condenser 24 by ice or hydrate will reduce the efficiency of the condenser and may limit the length of operation of the process by making it necessary to shut down periodically for servicing. If desired, the condenser can be divided into sections, some of which can be heated by internal hot gas flow for removal of ice or hydrate while the other sections continue in service. Some of the sections can also be taken out of service during periods of idling operation.

Because the condensing zone is essentially isolated, and preferably insulated, from the heat extraction zone, it is possible to clean either the vapor condensing zone or the heat extraction zone of the apparatus without allowing the other section to heat up. Moreover, as a result of this arrangement, the length of the interruptions in the freezing process for effecting cleaning are minimized.

When the freezing operation is first started up, air is displaced from the heat extraction zone and the vapor condensing zone by freezant vapor entering vessel 1 from any convenient source, such as bulk storage tank or shipping cylinder 30, and flowing into vapor condensing zone 22 before vapor condenser 24 is cooled to the operating temperature. In this manner moist air is removed from the area of the condenser without the formation of frost on the heat exchange surfaces. When the freezant vapor level reaches the top of vapor condenser 24, the temperature of the condenser is lowered to below the boiling point of the liquid freezant. Freezant then is introduced into the vessel as liquid or vapor, preferably as liquid. The freezing of food is commenced when sufficient liquid freezant is present to establish liquid flow through pump 13 and freezing pan 12. Any excess water or other liquid introduced with the food at entrance opening 6 passes through entrance conveyor 8 into cleanout area 31 and is discharged through drain valve 32.

For servicing the equipment or at the end of a freezing operation, freezant is removed from the freezing vessel by drain pump 33. The freezant is pumped into storage vessel 34 which is of sufficient capacity to hold, as a liquid, all of the freezant in the freezing system and which is designed to withstand the pressure developed when the freezant reaches ambient temperature. Storage vessel 34 can be above or below the bottom of the freezing vessel.

When the freezing operation is resumed after an extended shutdown, air is displaced from the heat extraction zone and the vapor condensing zone by freezant vapor passing from storage tank 30 or storage vessel 34 through return valve 35 before vapor condenser 24 is cooled to the operating temperature. When the freezant vapor level reaches the top of vapor condenser 24 the temperature of the condenser is adjusted to below the boiling point of the liquid freezant. When all the liquid freezant in vessel 34 has been vaporized, any sludge or residue remaining in the vessel can be removed through drain valve 36. Make-up freezant is then supplied from storage tank 30, as required. The aforesaid sludge or residue remaining in vessel 34 is of two types, namely, that which is soluble in freezant and that which is insoluble. If desired the latter can be removed from the freezant between the time it leaves sump 20 and enters vessel 34. For example, a coarse filter can be installed between pump 33 and vessel 34 to remove filterable solids.

All parts of the freezing apparatus which come in contact with the food should be made of materials capable of being cleaned by methods normally used for cleaning food handling equipment. Entrance conveyor 8 can be cleaned during operation whenever ice or food debris accumulates on the conveyor belt. The conveyor belt may be washed on the return flight with a suitable liquid by spray manifold 37 thereby dislodging debris which is drained from the housing through valve 32. Air manifold 38 can be used to blow air through the conveyor belt thereby removing water from the belt before food is placed on it.

Vapor overflow passage 21 must be closed if it is desired to avoid the entry of cleaning solutions into the condenser housing during cleaning of the heat extraction zone. If the passage is in the form of a vertically moveable plate, it is possible to change the elevation of the passage as well as to close it completely when desired. Since the lower edge of the passage between the two zones controls the lower level of the interface in the heat extraction zone, by adjusting the level of the lower edge it is possible to minimize the effects of turbulence in the heat extraction zone upon entrainment of air in the freezant vapor flowing through the passage. Variations in conveyor speed and changes in the method of contacting the articles with the liquid freezant affect the turbulence in the heat extraction zone.

A closable, controllably sized passageway 39, normally closed, may be provided between the heat extraction zone and the vapor condensing zone at a level near the bottom of the common wall to facilitate the recovery of freezant before the apparatus is to be opened for any reason. Recovery of freezant through passageway 39 is facilitated by having the base of the vapor condensing zone at a lower level than the base of the heat extraction zone. By "base of the heat extraction zone" is meant the base exclusive of sump 20. If there is no input of food, continued operation of the condenser will pull the interface below level 10 very quickly with resultant reduction of loss of freezant when the heat extraction zone is opened.

The embodiments of the invention in which an exclusive property or privilege is claimed are defined as follows:

1. In an improved method of extracting heat from articles by directly contacting the articles in a heat extraction zone of an open vessel with an ebullient, liquid, fluorinated, $C_1$ to $C_4$, saturated halohydrocarbon freezant having a vapor density at its normal boiling point of at least two times that of air at the same temperature, while maintaining a non-condensable gas-freezant vapor interface in the vessel by operating a vapor condensing means in the vessel below the normal boiling point of the freezant, the level of the interface being below the level of all paths to the outside atmosphere which are in free vapor communication with the heat extraction zone but above the level at which the articles come in direct contact with the liquid freezant, said articles being introduced into and removed from the vessel without substantially disturbing the interface and without introducing any significant amount of non-condensable gas below the interface, the improvement comprising producing and maintaining a first interface in the heat extraction zone and a second interface, at a lower level than the first, in an adjacent, vapor communicating, vapor condensing zone of the vessel by means of a vapor condensing means located in the vapor condensing zone, condensing substantially all the freezant vapor generated in the heat extraction zone and communicated to the vapor condensing zone, and recycling condensed freezant from the vapor condensing zone to the heat extraction zone.

2. The method of claim 1 wherein the freezant vapor generated in the heat extraction zone and communicated to the vapor condensing zone is passed through a vapor flow regulating means and directed toward the base of a vapor condenser wherein it is condensed.

3. The method of claim 2 wherein the articles are solid food, the non-condensable gas is air, and the freezant has a normal boiling point of 25° C. to −50° C. and a vapor density at its normal boiling point at least three times that of air at the same temperature.

4. The method of claim 3 wherein the freezant is dichlorodifluoromethane.

5. In an improved heat extraction apparatus comprising (A) an open vessel,
(B) a heat extraction zone within the vessel and adapted to hold a liquid freezant,
(C) a vapor condensing means in the vessel for producing and maintaining a non-condensable gas-freezant vapor interface,
(D) means for introducing articles into the heat extraction zone,
(E) means for conveying articles through the heat extraction zone,
(F) means within the heat extraction zone for causing articles to come in direct contact with liquid freezant, and
(G) means for conveying articles out of the vessel, the improved apparatus comprising, in addition to the above, (1) a vapor condensing zone within the vessel, which zone contains said vapor condensing means, the top of which means is below the level of all paths to the outside atmosphere from the zone, which zone is separated from the heat extraction zone by a vertically inclined wall having an opening which provides vapor communication between the zones, the opening being below any opening leading from the vessel to the outside atmosphere, and
(2) means for conducting liquid freezant from the vapor condensing zone to the heat extraction zone.

6. The improved apparatus of claim 5 wherein the opening between the zones is a controllably-sized elongated opening.

7. The improved apparatus of claim 5 wherein there is a freezant vapor flow regulating means between the vapor condensing means and the opening between the two zones.

8. The improved apparatus of claim 7 wherein the freezant vapor flow regulating means is a free hanging flexible curtain.

9. The improved apparatus of claim 5 wherein there is a closable, controllably sized passageway between the heat extraction zone and the vapor condensing zone at a level near the bottom of the vertically inclined wall, and the level of the base of the vapor condensing zone is lower than the level of the base of the heat extraction zone.

10. The improved apparatus of claim 5 comprising, in addition, a liquid holding sump and a top cover for the vapor condensing zone, the top cover being provided with removable seals for the paths to the outside atmosphere.

References Cited

UNITED STATES PATENTS 3,368,363  2/1968  Alaburda et al. _____ 62—64
3,486,345  12/1969  Waldin _____ 62—63

MEYER PERLIN, Primary Examiner

R. C. CAPOSSELA, Assistant Examiner

U.S. Cl. X.R.

62—64, 375; 99—198